(12) United States Patent
Xu et al.

(10) Patent No.: US 7,455,075 B2
(45) Date of Patent: Nov. 25, 2008

(54) SERVO VALVE WITH MINIATURE EMBEDDED FORCE MOTOR WITH STIFFENED ARMATURE

(75) Inventors: Yao Hui Xu, Chandler, AZ (US); Rodolfo D. Sanchez, Tempe, AZ (US); Shen Zhao, Tokyo (JP); Bill Fanestil, Sequim, WA (US)

(73) Assignee: Minebea Co., Ltd. (JP)

( * ) Notice: Subject to any disclaimer, the term of this patent is extended or adjusted under 35 U.S.C. 154(b) by 153 days.

(21) Appl. No.: 11/145,324

(22) Filed: Jun. 3, 2005

(65) Prior Publication Data

US 2005/0279415 A1 Dec. 22, 2005

Related U.S. Application Data

(60) Provisional application No. 60/636,657, filed on Dec. 16, 2004, provisional application No. 60/636,606, filed on Dec. 16, 2004, provisional application No. 60/578,695, filed on Jun. 14, 2004.

(51) Int. Cl.
*F16K 31/08* (2006.01)

(52) U.S. Cl. .................. 137/627.5; 251/30.01; 251/65

(58) Field of Classification Search .............. 137/627.5; 251/30.01, 65; 335/266, 268, 306
See application file for complete search history.

(56) References Cited

U.S. PATENT DOCUMENTS

| | | | |
|---|---|---|---|
| 2,407,603 A * | 9/1946 | Derungs ...................... 335/256 |
| 2,579,723 A * | 12/1951 | Best ............................ 251/65 |
| 2,811,979 A * | 11/1957 | Presnell ..................... 137/112 |
| 2,905,462 A * | 9/1959 | Christensen .............. 267/64.16 |
| 2,986,368 A * | 5/1961 | Moore ....................... 251/30.01 |
| 3,608,585 A * | 9/1971 | Huntington ............ 137/625.65 |
| 3,842,860 A * | 10/1974 | Stampfli ................. 137/596.17 |
| 3,921,666 A * | 11/1975 | Leiber ........................ 137/557 |
| 3,989,063 A * | 11/1976 | Brouwers et al. ....... 137/596.17 |
| 4,253,493 A * | 3/1981 | English .................. 137/625.18 |
| 4,506,701 A * | 3/1985 | Masaki et al. .......... 137/596.17 |
| 4,531,547 A * | 7/1985 | Hadden .................. 137/625.64 |
| 4,538,129 A * | 8/1985 | Fisher ......................... 335/230 |
| 4,559,971 A * | 12/1985 | Bradshaw .............. 137/596.17 |
| 4,621,660 A * | 11/1986 | Klocke ................... 137/625.44 |
| 4,624,443 A * | 11/1986 | Eidsmore ..................... 251/65 |
| 4,655,255 A * | 4/1987 | Rode ........................ 137/627.5 |
| 4,674,536 A * | 6/1987 | Warrick .................. 137/614.19 |
| 4,690,371 A * | 9/1987 | Bosley et al. .................. 251/65 |
| 4,778,227 A * | 10/1988 | Bayliss ..................... 303/119.2 |

(Continued)

*Primary Examiner*—John Rivell
*Assistant Examiner*—Craig Price
(74) *Attorney, Agent, or Firm*—Townsend and Townsend and Crew LLP

(57) ABSTRACT

A servo valve has a miniature force motor embedded in a main fluid chamber to directly operate between two nozzles to generate a differential pressure in two ports. The miniature force motor includes two disc ring-shaped magnets in opposing magnetic orientation, an armature base and poppet ends of magnetic material coupled to an armature shaft having pilot ends that interface to form the pilot stage valves at each armature shaft end. The armature shaft extends through a center hole in the magnets, armature base, and the poppet ends and engages bearing elements at each end allowing lateral armature motion. Two elastic members provide restoring forces to the armature assembly. Guide/stops have shaped magnetic surfaces to control the magnetic path and to linearize the force versus stroke and to increase the proportional stroke of the armature.

26 Claims, 10 Drawing Sheets

U.S. PATENT DOCUMENTS

| | | | | |
|---|---|---|---|---|
| 5,007,455 A | * | 4/1991 | Hawker | 137/596.16 |
| 5,101,862 A | * | 4/1992 | Leete | 137/899 |
| 5,503,185 A | * | 4/1996 | Krause | 137/625.65 |
| 5,814,907 A | * | 9/1998 | Bandera | 310/14 |
| 5,860,631 A | * | 1/1999 | Feigel | 251/30.03 |
| 6,158,713 A | * | 12/2000 | Ohya et al. | 251/65 |
| 6,382,256 B2 | * | 5/2002 | Kim et al. | 137/870 |
| 6,501,357 B2 | * | 12/2002 | Petro | 335/229 |
| 6,546,959 B2 | * | 4/2003 | Cross et al. | 137/627.5 |
| 6,644,350 B1 | * | 11/2003 | Douglass et al. | 137/625.64 |
| 6,722,330 B2 | * | 4/2004 | Pierik et al. | 123/90.17 |
| 2003/0222534 A1 | * | 12/2003 | Xu | 310/261 |

* cited by examiner

SERVO VALVE WITH MINIATURE EMBEDDED FORCE MOTOR WITH STIFFENED ARMATURE

PRIORITY BENEFIT AND CROSS REFERENCE TO RELATED APPLICATIONS

This application is related to the following commonly owned copending U.S. Patent Applications:

Provisional Application Ser. No. 60/578,695, "Miniature Force Motor Embedded Pilot Stage for Servo Valve", filed Jun. 14, 2004, and claims the benefit of its earlier filing date under 35 U.S.C. 119(e).

Provisional Application Ser. No. 60/636,657, "Servo Valve with Embedded Miniature Force Motor with Improved Armature", filed Dec. 16, 2004, and claims the benefit of its earlier filing date under 35 U.S.C. 119(e).

Provisional Application Ser. No. 60/636,606, "Servo Valve with Embedded Miniature Force Motor with Stiffened Armature", filed Dec. 16, 2004, and claims the benefit of its earlier filing date under 35 U.S.C. 119(e).

TECHNICAL FIELD

The present invention relates in general to servo valves, and more particularly to a hydraulic servo valve structure with an embedded force motor that is more rugged while maintaining small size and low cost.

BACKGROUND INFORMATION

Servo valves are a class of devices used in hydraulic systems using electromagnetic control. Typically the electromagnetic stage is separate from a pilot stage that is used to generate fluid streams with differential pressures operable to move larger valves by applying the pressure differences to larger surfaces areas. An electromagnetic stage is used so electronic feedback control may be applied to the overall hydraulic system employing a servo valve. The electromagnetic stage is typically a solenoid, torque motor, or force motor structure. In solenoids, the force allows a cylindrical element to be moved into a solenoid coil with a restoring force of a spring used to move the cylindrical element out of the coil when de-energized. By adding permanent magnets to the structure, a linear force motor may be configured that allows the armature to be electrically driven in both directions with low input power.

Current industry designs for the force motors used in servo valve systems use a permanent magnet and a set of coils to superimpose magnetic fields at two air gaps to create a differential magnetic force. The coils produce a magnetic field directed through a cylindrical volume and permanent magnets produce a magnetic field that interacts with the magnetic field of the coils. The permanent magnet is set outside the cylindrical armature that is stational with the coils configured as the force motor of the first stage. In prior art designs, the force motor is external to a pilot valve and coupled to a flap/nozzle valve structure for generating differential pressure in the two differential pressure fluid flow paths. The two differential pressure fluid flow paths are then coupled to the main servo valve where the differential pressure is used to move elements of the larger servo valve to amplify the hydraulic produced force for moving large objects. Having three independent separated stages limits the size of present servo valves. In many of these applications, the size of the present servo valve structures limits the applicability of hydraulic servo systems.

When servo valves using a pilot stage with an embedded force motor are used in high vibrational applications the armature needs to be stiffer to resist deflections that may lead to increased wear and reduce reliability of the sliding surfaces of the armature.

There is, therefore, a need for a servo valve structure with an embedded force motor that is more rugged while maintaining small size and low cost.

SUMMARY

A servo valve structure has two independent control ports linked to a main chamber fed via two poppet valves. A force motor for operating the servo valve is embedded in the servo valve. The chamber walls comprise a bobbin assembly including a yoke of magnetic material and a non magnetic bobbin element use in the stator of the force motor. The chamber has a guide/stop with surface features providing magnetic coupling with a moving armature assembly that is disposed within the chamber. The armature assembly comprises an armature shaft constructed of non-magnetic material, armature base of magnetic material, two embedded disc-ring shaped permanent magnets with opposing magnetic polarization fitted over the armature shaft and held with a non-magnetic ring. The ends of the armature shaft fit into a cylindrical bearing that support the armature shaft and additionally allow the armature assembly to move laterally. The armature shaft is also suspended by bearings at each end configured to keep the armature assembly longitudinally centered in the main chamber when the coils are de-energized. A drive coil is circumferentially wound in the bobbin assembly and produces magnetic flux in response to coil current. Depending on the direction of the current in the coil, the magnetic flux of the coil aids the magnetic flux of the magnets at one air gap and opposes the magnetic flux of the magnet at the other air gap. In this manner, the differential force is created, and the armature is moved longitudinally within the chamber by the differential magnetic force acting to overcome the restoring force of the two spiral Archimedes springs. The armature shaft has two ends each forming one side of the two pilot valves. The armature assembly moves within the main chamber which is coupled to the return port. Depending on the position of the armature, one of the two pilot valves is opening as the other is closing causing a pressure drop in proportion to the relative open cross-sectional areas of the pilot valves. In this manner, the two control ports develop differential pressures. These two control ports are used to control a larger, main stage servo valve.

In this embodiment of the present invention, the armature assembly is supported by an armature shaft with poppet ends that fit into a cylindrical bearing at either end. In this embodiment, there is no sliding contact between the armature assembly and elements making up the main chamber. In this manner, the stiffness of the armature assembly is controlled by the armature shaft. The clearance between the armature assembly and the main chamber is sized to ensure that no contact occurs when the servo valve undergoes high vibration forces in a non-lateral direction The surface features of the armature and the surface features of the chamber are configured to ensure that the magnetic flux produces an optimized linear force over the extent of armature travel.

In another embodiment of the present invention, a servo valve comprises a chamber having first and second end caps with first and second pilot valve seats with openings to first and second ports. The servo valve may further comprise a force motor comprising a stator having a stator coil and forming a cylindrical portion of the chamber. The force motor may further comprise an armature assembly movable inside the chamber in response to a current in the stator coil. The armature assembly may be held on either end of the chamber with elastic members. The armature assembly may comprise a plurality of pilot valves formed by interfacing with the chamber. Each of the plurality of pilot valves is formed when a pilot interfaces with one of the first and second pilot valve seats. The force motor may further comprise a plurality of guide/stops in contact with the armature assembly where the plurality of guide/stops forms a portion of the stator of the force motor. The servo valve may further comprise a third port coupled to the chamber and configured to receive fluid under pressure.

In another embodiment of the present invention, a servo valve comprises a chamber having first and second end caps with first and second pilot valve seats with openings to first and second ports. The servo valve may further comprise a force motor comprising a stator having a stator coil and forming a cylindrical portion of the chamber. The force motor may further comprise an armature assembly movable inside the chamber in response to a current in the stator coil. The armature assembly may be held on either end of the chamber with elastic members. The armature assembly may comprise a plurality of pilot valves formed by interfacing with the chamber. Each of the plurality of pilot valves is formed when a pilot interfaces with one of the first and second pilot valve seats. The force motor may further comprise a plurality of guide/stops in contact with the armature assembly where the plurality of guide/stops forms a portion of the stator of the force motor. Further, the plurality of guide/stops contacts a poppet end on the armature assembly using circumferential bearing elements. The servo valve may further comprise a third port coupled to the chamber and configured to receive fluid under pressure.

In another embodiment of the present invention, a servo valve comprises a chamber having first and second end caps with first and second pilot valve seats with openings to first and second ports. The servo valve may further comprise a force motor comprising a stator having a stator coil and forming a cylindrical portion of the chamber. The force motor may further comprise an armature assembly movable inside the chamber in response to a current in the stator coil. The armature assembly may be held on either end of the chamber with elastic members. The armature assembly may comprise a plurality of pilot valves formed by interfacing with the chamber. Each of the plurality of pilot valves is formed when a pilot interfaces with one of the first and second pilot valve seats. The armature assembly may further comprise a non-magnetic shaft configured to engage a cylindrical bearing element where the non-magnetic shaft is coupled to the elastic members that operate to center the armature assembly between the first and second pilot valve seats. The force motor may further comprise a plurality of guide/stops in contact with the armature assembly where the plurality of guide/stops forms a portion of the stator of the force motor. The servo valve may further comprise a third port coupled to the chamber and configured to receive fluid under pressure.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1A:
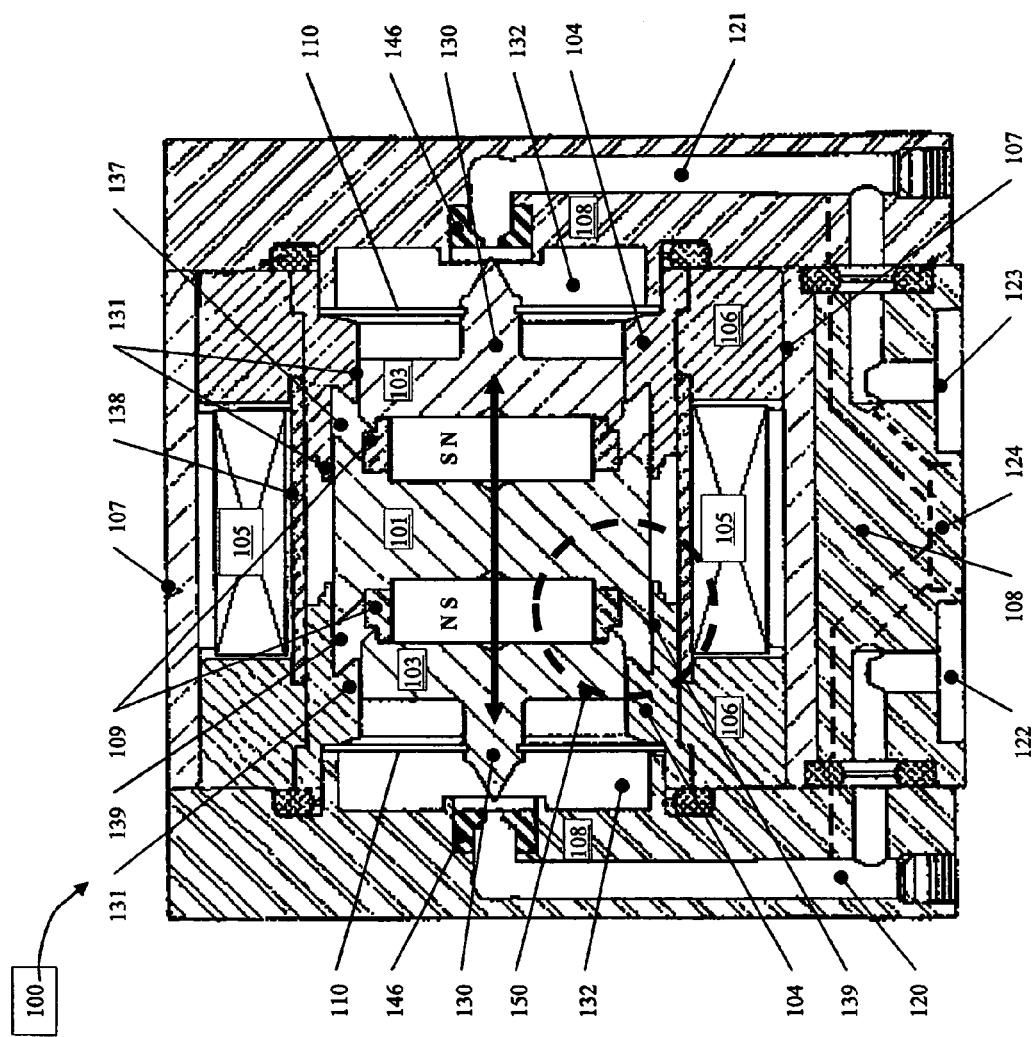
FIG. 1A is a cross-section of a miniature servo valve with an embedded force motor illustrating the interactions with the functioning elements used in embodiments of the present invention.

In the following description, numerous specific details are set forth to provide a thorough understanding of the present invention. However, it will be obvious to those skilled in the art that the present invention may be practiced without such specific details. For the most part, details concerning well known elements and the like have been omitted inasmuch as such details are not necessary to obtain a complete understanding of the present invention and are within the skills of persons of ordinary skill in the relevant art.

This invention provides a kind of new compact force motor design comprised of an armature (includes an armature base, two pieces of disc-shaped permanent magnets and two pieces with poppet ends) and two or more insulators. The stator of the force motor comprises a coil/bobbin assembly, a coil case and two armature stop/guide members which along with the armature base form magnetic paths for coupling flux from the control coils through the magnetic path of the disc-shaped permanent magnets. The force motor has a novel structure in that the two pieces of disc-shaped permanent magnets are magnetized along an axial direction and embedded with the armature base in a back-to-back orientation. Depending on the direction of the current in the control coil, the magnetic flux of the control coil generates an enhanced magnetic field to one of the permanent magnets and a cancellation magnetic field on the other. Additionally poppet ends of magnetic material are coupled axially with the disc-shaped permanent magnetic elements. The poppet ends interface to form two poppet valves on either end of the armature. When the armature is moved by the action of the force motor, the two poppet ends on the armature work as pilots directly driving the poppet/ nozzle valves in both directions from the center to the both ends. This makes for a very dimensionally compact force motor that is very efficient in the ratio of output force to the energizing current in the control coil compared to prior art force motors used in servo valves.

The force motor used in embodiments of the present invention also have novel geometrical shapes to the surfaces of the magnetic material of the central armature base and the guide/ stop member. One of the surface features of the guide/stop is a stepped surface configured to approximate a desired concave shape with the recess toward the centrifugal direction from the armature assembly, which is suitable to achieve both a longer proportional stroke and optimum linearity of force- stroke curves. The force-stroke curves can be controlled through local magnetic flux distribution by adjusting the two cross-sectional areas of the guide/stops and the face angle of the armature. The magnetic flux produced by the two permanent magnets and the coil is limited by a combination of the internal dimensions, and the length and diameter of each cylindrical surface of the guide/stop.

These special surface shapes enable the force motor of the present invention to produce a constant output force proportional to the current (power) over a much long stroke range compared to prior art force motors. The disc-shaped permanent magnets employed in embodiments of the present invention are small in dimensions and easy to magnetize. The armature assembly is supported by two Archimedes springs (one at either end) and embodiments use cylindrical bearing surfaces on the armature and guide/stop and do not need a separate axle. One embodiment uses Process Bonded Bronze/ PTFE (Teflon) sliding surfaces on the magnetic armature base, the guide/stops, and the poppet ends. Other embodiments use high density polyethylene bearing elements to eliminate contact between magnetic surfaces. Other embodiments use a separate armature shaft with end bearings instead of allowing magnetic surfaces to contact or in place of sliding bearing elements.

Refer now to the drawings wherein depicted elements are not necessarily shown to scale and wherein like or similar elements are designated by the same reference numeral through the several views. In the following, disc-shaped refers to a circular shaped element whose thickness is substantially less than its diameter. In the following a pilot valve means a small balanced valve which operates to control a fluid under pressure to a larger control valve. A pilot valve is sometimes referred to as a relay valve. A servo valve is an electromechanical valve that uses feedback to provide precise control of fluid under pressure to operate a hydraulic system delivering hydraulic power to mechanical elements.

FIG. 1A is a cross-sectional view of a servo valve 100 according to embodiments of the present invention. Referring to FIG. 1A, servo valve 100 has an armature assembly that moves inside of a main chamber 132. In one embodiment, the armature assembly, as used herein, refers to the combination of the following elements: armature base 101, poppet ends 103, disc-shaped magnets 102, 152. It is noted that the armature assembly may include other elements that are not mentioned herein. It is further noted that when the term armature assembly is used herein in association with different embodiments, e.g., FIGS. 2A-B, FIGS. 3A-B, that the term armature assembly refers to the combination of the above-stated elements.

Referring to FIG. 1A, main chamber 132 is formed by elements that include yokes 106 and a bobbin piece 138 which make up a bobbin assembly. In one embodiment, the bobbin assembly may include yoke elements 106, case 107, non-magnetic bobbin piece 138 and coil 105. It is noted that the bobbin assembly may include other elements that are not mentioned herein. It is further noted that when the term bobbin assembly is used herein in association with different embodiments, e.g., FIGS. 2A-B, FIGS. 3A-B, that the term bobbin assembly refers to the combination of the above-stated elements.

Referring to FIG. 1A, magnetic yokes 106 are made of magnetic material and form part of the path for the magnetic flux that results from energizing control coils 105. Guide/ stops 104 form part of a stator of a force motor and have surfaces that are in contact with the moving armature assembly. In one embodiment, the stator may include the bobbin assembly and guide/stops 104. It is noted that the stator may include other elements that are not mentioned herein. It is further noted that when the term stator is used herein in association with different embodiments, e.g., FIGS. 2A-B, FIGS. 3A-B, that the term stator refers to the combination of the above-stated elements. In one embodiment, the force motor may include the stator and armature assembly. It is noted that the force motor may include other elements that are not mentioned herein. It is further noted that when the term force motor is used herein in association with different embodiments, e.g., FIGS. 2A-B, FIGS. 3A-B, that the term force motor refers to the combination of the above-stated elements.

Details of bearing contact surfaces 131 and the special surface shapes on guide/stops 104 and armature base 101 are shown in dotted area 150. Dotted area 150 is shown in more detail in FIGS. 1B-1C as discussed further below. Fluid is delivered to port 124 at a high pressure and undergoes pressure drops through a first of two fixed orifices (not shown), one for each path 120 and 121. A second pressure drop happens at each pilot valve controlled by poppet ends 103 on the armature assembly. In one embodiment, the pilot valve may include a pilot end 130 and a pilot valve seat 146. It is noted that the pilot valve may include other elements that are not mentioned herein. It is further noted that when the term pilot valve is used herein in association with different embodiments, e.g., FIGS. 2A-B, FIGS. 3A-B, that the term pilot valve refers to the combination of the above-stated elements. The fluid in main chamber 132 is coupled to the return port (not shown) which is at atmospheric pressure.

The armature assembly moves within main chamber 132 and is composed of armature base 101, two disc-shaped magnets 102 and 152 as well as two poppet ends 103. Poppet ends 103 each have pilot ends 130 that interface with the pilot valves on each fluid path 120 and 121. Disc-shaped magnets 102 and 152 are magnetically polarized in opposing directions. The magnetic flux from (not shown in this view) exemplary permanent magnet 102 is directed, starting in a left direction, through left poppet end 103, left guide/stops 104, through air gap 139 and closes through armature base 101. The magnetic flux (not shown in this view) from exemplary permanent magnet 152 is directed in a right direction through right poppet end 103 and right guide/stops 104, through air gap 137 and again closes through armature base 101. Disc- shaped magnets 102 and 152 are attached to armature base 101 with non-magnetic insulators 109 to prevent magnetic flux from leaking between armature base 101 and two poppet ends 103. The armature slides on bearing contact surfaces 131 which are configured (e.g., Process Bonded Bronze/PTFE) to form bearing surfaces. Bearing contact surfaces 131 are shown in detail in FIG. 1B, as discussed further below. The armature assembly is held on either end in main chamber 132 with elastic members 110 (e.g., Archimedes springs.)

Referring to FIG. 1A, control coil 105 is circumferentially wound in the bobbin assembly formed by yoke elements 106 and non-magnetic bobbin piece 138. When control coil 105 is energized, it produces magnetic flux (not shown in this view) that interacts with the magnetic flux of disc-shaped permanent magnets 102 and 152 in air gaps 137 and 139 to produce lateral force. The magnetic flux of coil 105 is primarily directed through one guide/stop 104, air gaps 137 and 139, armature base 101, second guide/stop 104 and returning through coils case 107. Depending on the direction of the current in coil 105, the magnetic flux in air gaps 137 and 139 either aids or reduces the magnetic flux of corresponding permanent magnets 102 and 152. The force resulting from the interaction of the magnetic field of control coil 105 and permanent magnets 102 and 152 causes the armature to move either left or right against the support springs 110 depending on the direction of the current in control coil 105. As stated above, each pilot end 130 on poppet ends 103 interface with a seat 146 to form a pilot valve. As the armature assembly moves under the action of the embedded force motor, one end of the pilot valve increasingly opens and the other end increasingly closes thereby changing the pressure drop across the pilot valve to cause fluid in path 120 and 121 to exhibit differential pressures. Control ports 122 and 123 deliver the differential to the main stage (not shown). The fluid in main chamber 132 is coupled to the return port (not shown) which is at atmospheric pressure.

Figure 1B:
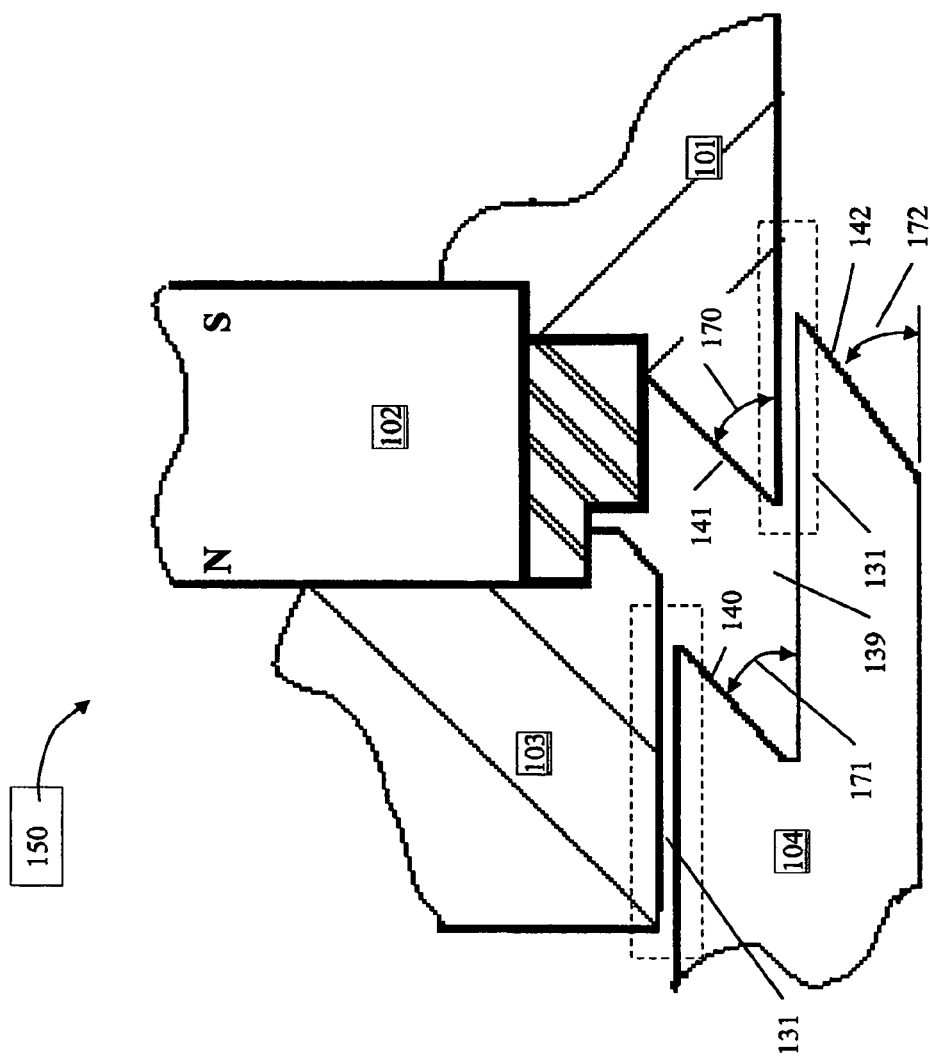
FIG. 1B is a cross-section of a portion of the miniature servo valve of FIG. 1A detailing surface features used in embodiments of the present invention that ensure that the force moving the armature of the force motor is substantially constant with the armature stroke.

FIG. 1B illustrates an embodiment of the present invention with an expanded view of dotted area 150 shown in FIG. 1A to further describe bearing contact surfaces 131 and surface features 140-142 on armature base 101 and guide/stop 104. Referring to FIG. 1B, FIG. 1B shows a portion of armature base 101, poppet end 103, magnet 102 and non-magnetic insulator 109 used to retain magnet 102. Bearing contact surfaces 131 are shown doted and indicate where guide/stop 104 contacts poppet end 103 and armature base 101. These bearing contact surfaces 131 are configured to reduce sliding friction. Features 140-142 are sloped to modify the magnetic paths of air gap 139 and leakage paths between guide/stop 104 and armature base 101 and aid in ensuring a linear force versus applied input current to coil 105 (not shown in this view). While this view only shows one of the four cross-sections displaying the relationship of these sliding surfaces and magnetic features between the armature and the stator of the force motor, it is understood that the other three areas have like features. Details of sloped surface features 140-141 primarily control exemplary air gap 139. Further, slope feature 142 affects the leakage path between guide/stop 104 and armature base 101. Angles 170-171 may be same or may be different. Likewise angle 172 may be adjusted to optimize leakage flux characteristics. Typically, angles 170-172 are interactively adjusted to obtain a desired force versus armature stroke characteristic. For example, in embodiments of the present invention, the angles are interactively adjusted to give a resultant force versus armature stroke that is substantially constant.

As the armature assembly moves left to close exemplary air gap 139, the reluctance of the magnetic flux path (dominated by the air gap 139) gets smaller. Thus, it would be expected that the flux in air gap 139 would increase and that the resultant force would also increase. However, the area coupling leakage flux around air gap 139 (controlled by angle 172 on surface 142) also increases thereby reducing the flux in air gap 139. The net effect causes the resultant force to be substantially constant versus armature assembly stroke.

Figure 1C:
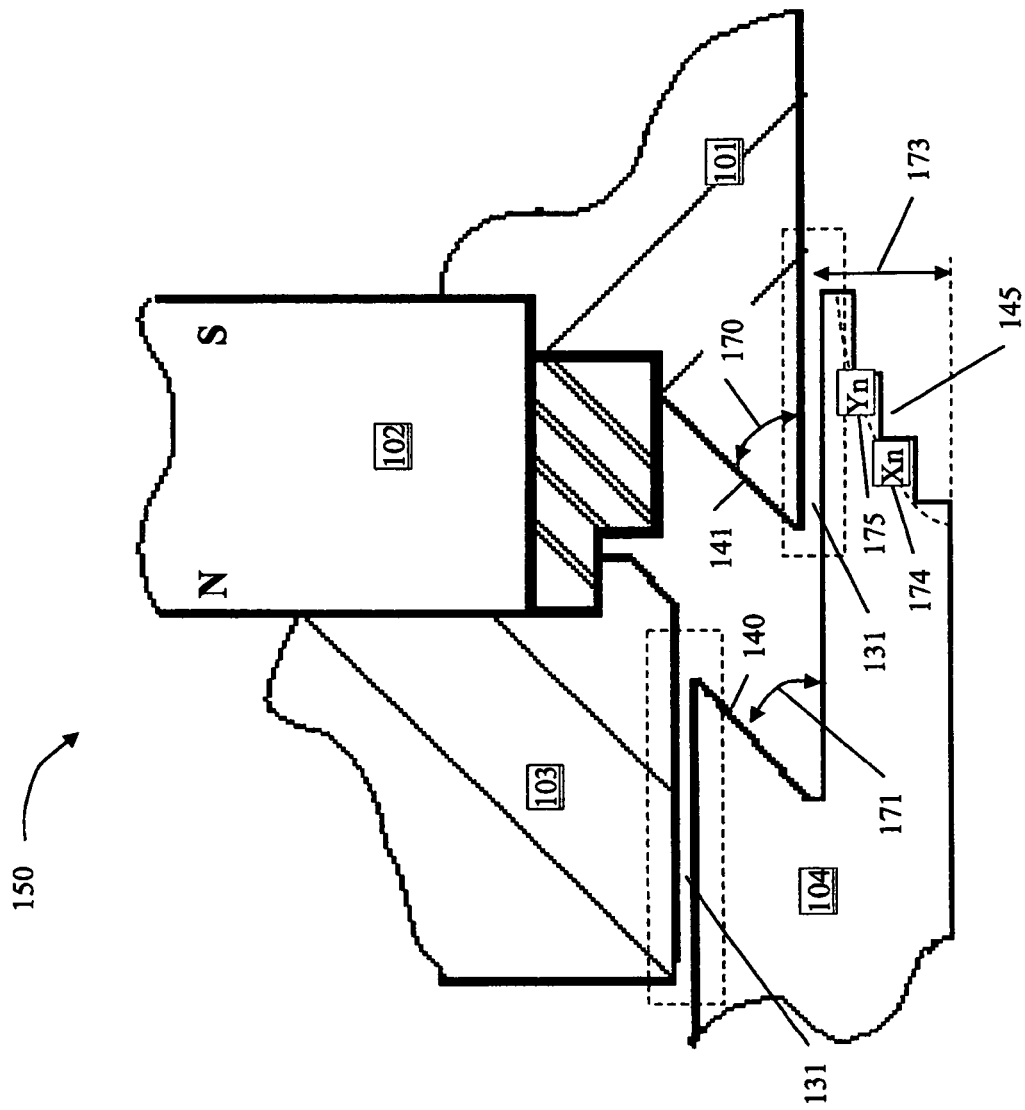
FIG. 1C is a cross-section of a portion of the force motor of FIG. 1A illustrating sliding bearing surfaces and a stepped, sloped magnetic flux surface on one side of the guide stops used in embodiments of the present invention.

FIG. 1C is another embodiment that shows a portion of armature base 101, poppet end 103, magnet 102 and non-magnetic insulator 109 used to retain magnet 102. Referring to FIG. 1C, bearing contact surfaces 131 are shown doted and indicate when guide/stop 104 contacts poppet end 103 and armature base 101. These bearing contact surfaces are configured to reduce sliding friction. Sloped surface 142 in FIG. 1B is replaced with sloped stepped surface 145 and which is configured to adjust the leakage magnetic flux and to control the local magnetic field distribution to realize a substantially flat force versus stroke curve and a relatively long proportional stroke for the force motor. Stepped slope 145 modifies the leakage flux across the interface between guide/stop 104 and armature base 101. The effective leakage path to armature base 101 is a function of distance 173 and of the Xn 174 and Yn 175 step dimensions, which will determine how many steps are realized for a given distance 173. Each of the Xn 174 and Yn 175 dimensions, making up the steps on slope 145, may be the same or they may be different for each step approximating more closely to the desired curve surface, thereby adding additional parameters that may be used to customize the force versus the armature assembly stroke for servo valve 100. While this view only shows one of the four cross-sections displaying this embodiment and the relationship of these sliding surfaces and magnetic features between the armature and the stator of the force motor, it is understood that the other three areas would have like features.

In further explanation, one of the surface features of the guide/stop is a stepped surface 145 configured to approximate a desired concave shape with the recess toward the centrifugal direction from the armature assembly, which is suitable to achieve both a longer proportional stroke and optimum linearity of force-stroke curves. The stepped surface is comprised of a group of cylindrical surfaces with gradually decreasing diameters towards the armature, and flat face surfaces between each cylindrical surface The desired concave shape is formed by a line joining inboard acute junctions of cylindrical and face surfaces, each of which is located between the cylindrical surface with smaller diameter and the face surface connected with the next cylindrical surface with larger diameter. The shape of the concave surface can be adjusted through adjusting the diameters and the lengths of the cylindrical surfaces. The magnetic flux path is mainly affected by the cross-sectional area between concave surface and the internal surface of the guide/stop. The cross-sectional area changes along the proportional stroke as a function of the concave shape. The length of the proportional stroke mainly depends on the length of the concave shape, and the linearity of the proportional stroke mainly depends on the degree of the approximation of the desired concave shape. Compared to a conical surface that is widely used to prolong the proportional stroke and to improve the force-stroke curves, the stepped surface, a novel structure of this invention, is closer to the desired concave shape, and therefore longer proportional stroke and better linearity of the force-stroke curves can be achieved.

The force-stroke curves can be controlled through local magnetic flux distribution by adjusting the two cross-sectional areas of the guides and the face angle of the armature. The magnetic flux produced by two permanent magnets and the coil is limited by a combination of the internal dimensions, and the length and diameter of each cylindrical surface of the guide.

Figure 1D:
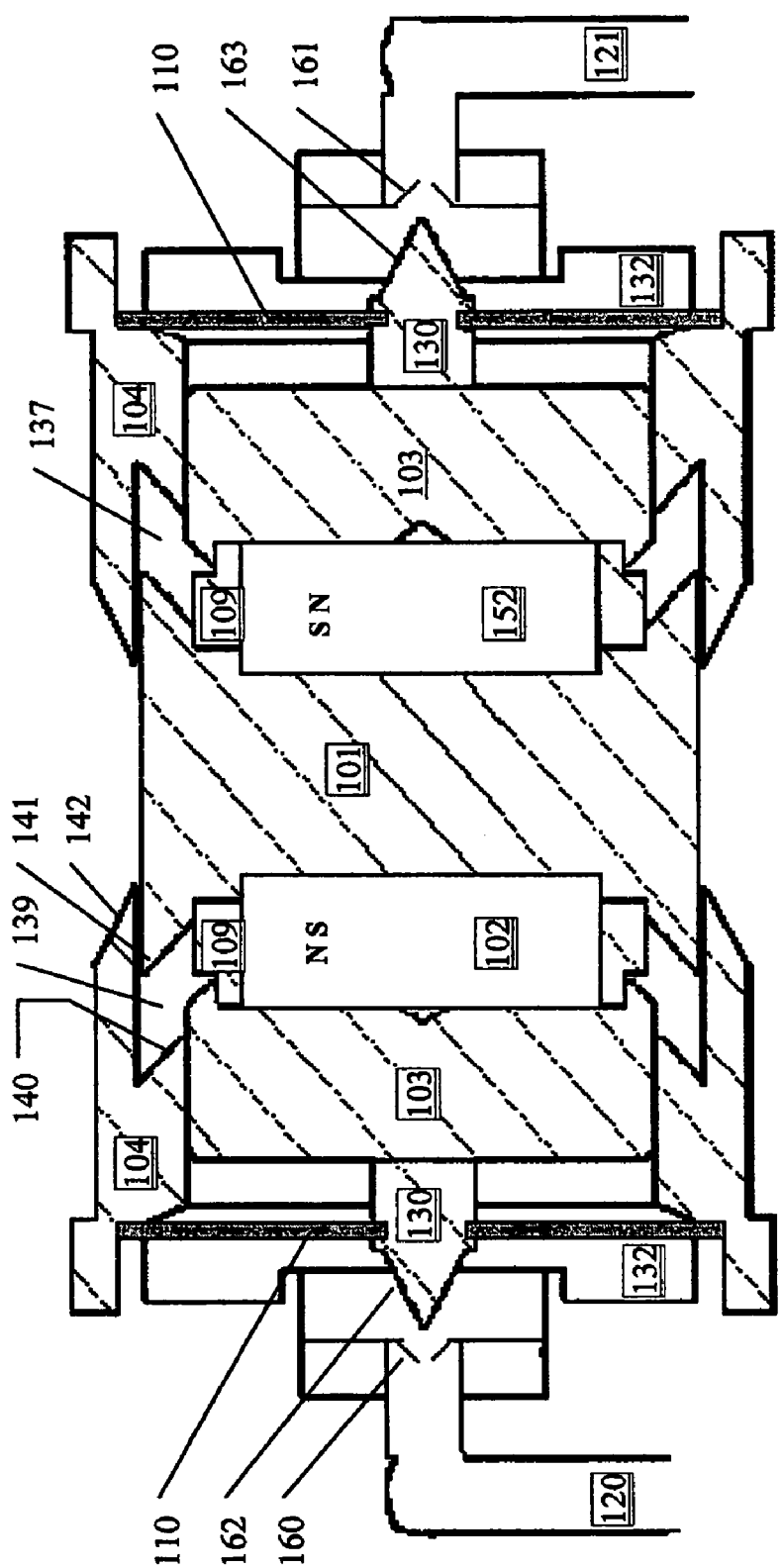
FIG. 1D is cross-section of a portion of the force motor of FIG. 1A illustrating details of the pilot valve used in embodiments of the present invention.

FIG. 1D illustrates an embodiment of servo valve 100 of the present invention of a pilot valve at the interface between paths 120 and 121 shown in FIGS. 1A-1B. Referring to FIG. 1D, each exemplary pilot valve (e.g., in paths 120) has a valve body with nozzle opening 160 at the bottom of a sloped "V". A mating "V" 162 on the left pilot end 130 functions to open and close the path to the opening 160 as the armature moves laterally. Elastic members 110 (e.g., Archimedes springs) retain and provide restoring force to center the armature assembly in a neutral position relative to the two pilot stage valves. Non-magnetic insulators 109 hold the permanent magnets 102 and 152 within the armature assembly. Guide/stops 104 provide the bearing interface surfaces and the magnetic path features 140-142. Paths 121 have a like valve body with nozzle opening 161 and corresponding mating "V" 163 on right pilot end 130.

Figure 2A:
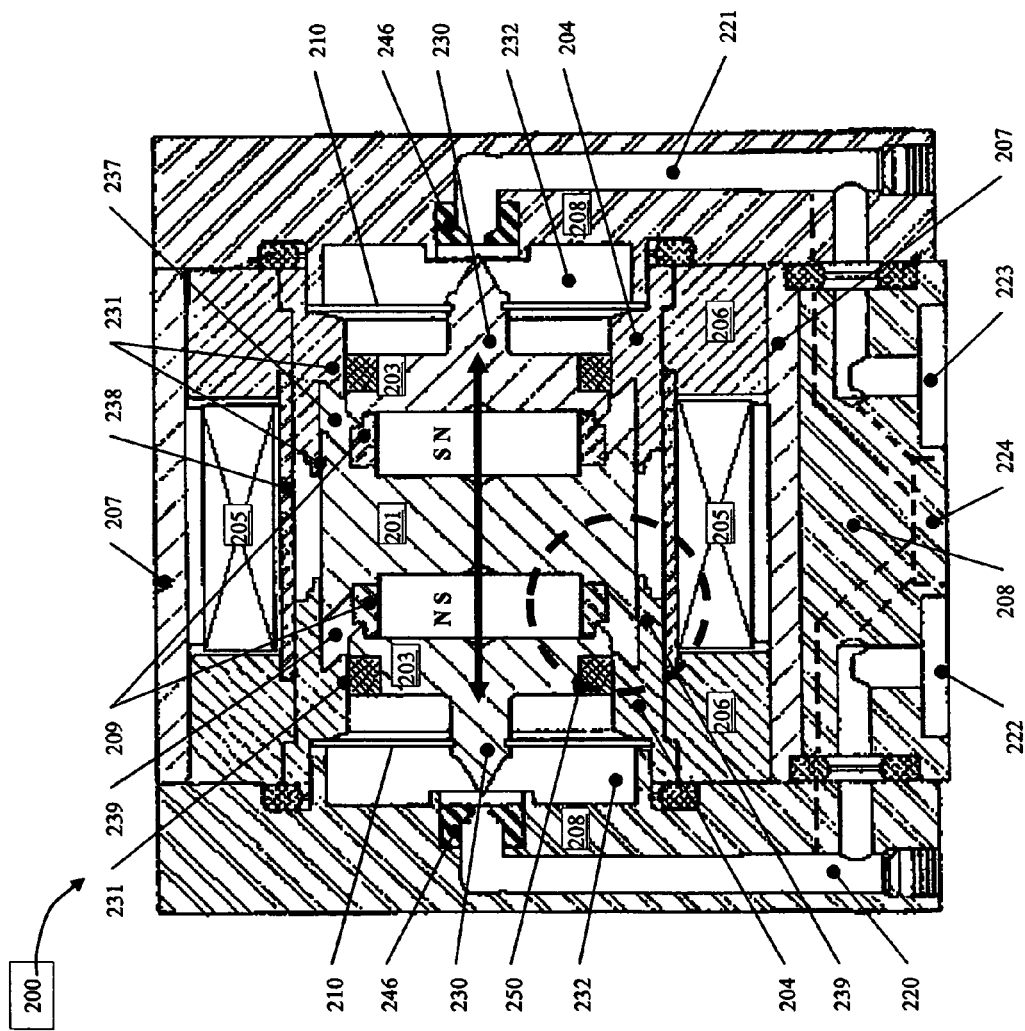
FIG. 2A is a cross-section of a miniature servo valve according to embodiments of the present invention with an embedded force motor whose armature moves on non-magnetic bearing surfaces.

FIG. 2A is a cross-sectional view of an embodiment of an embedded force motor in servo valve 200 according to embodiments of the present invention. In servo valve 100 of FIG. 1A, sliding bearing contact surfaces 131 comprise surfaces of armature base 101, pilot ends 130, and guide/stops 104. While the sliding bearing contact surfaces 131 may be coated to improve sliding friction, they may not be robust enough to have desired life and reliability when operated in applications requiring the servo valve to sustain high vibrational forces. High vibrational forces that generate non-lateral motion of the armature may cause surface checking or other deformations which lead to increased friction, lower performance and ultimately may lead to failure. The armature assembly of servo valve 100 of FIG. 1A, while simple and low cost, comprises a non-solid structure where armature base 101, permanent magnets 102 and 152, and poppet ends 103 are coupled together with additional elements (e.g., non magnetic insulators 109) thereby forming a structure that may be subject to undesirable motion when excited by high vibrational forces.

Referring to FIG. 2A, servo valve 200 has an embedded force motor that again comprises an armature assembly that moves inside of a main chamber 232. Main chamber 232 is formed by yokes 206 and a bobbin piece 238 which make up the bobbin assembly. Magnetic yokes 206 are made of magnetic material and form part of the path for the magnetic flux that results from energizing control coils 205. Guide/stops 204 form part of a stator of a force motor and have surfaces that are in contact with bearing elements 231 on poppet ends 203 of the moving armature assembly. Details of bearing element 231 and contact surfaces along with special surface shapes on guide/stops 204 and armature base 201 are shown in dotted area 250. Dotted area 250 is shown in more detail in FIG. 2B, which is described in further detail below. Fluid is delivered to port 224 at a high pressure and undergoes pressure drops through a first of two fixed orifices (not shown), one for each path 220 and 221. A second pressure drop happens at each pilot valve controlled by poppet ends 203 on the armature assembly. The fluid in main chamber 232 is coupled to the return port (not shown) which is at atmospheric pressure.

The armature assembly moves within main chamber 232 and is composed of armature base 201, two disc-shaped magnets 202 and 252 as well as two poppet ends 203. Poppet ends 203 each have pilots 230 that interface with pilot valves (pilot end 230 and pilot valve seat 246) on each fluid path 220 and 221. Disc-shaped magnets 202 and 252 are magnetically polarized in opposing directions. The magnetic flux from (not shown in this view) exemplary permanent magnet 202 is directed, starting in a left direction, through left poppet end 203, left guide/stops 204, through air gap 239 and closes through armature base 201. The magnetic flux (not shown in this view) from exemplary permanent magnet 252 is directed in a right direction through right poppet end 203 and right guide/stops 204 and again closes through armature base 201. Disc-shaped magnets 202 and 252 are attached to armature base 201 with non-magnetic insulators 209 to prevent magnetic flux from leaking between armature base 201 and the two poppet ends 203. The armature slides on bearing surfaces compatible with (e.g., high density poly ethylene) (HDPE) bearing insert 231 that provides low sliding friction forces. Bearing elements 231 and the surface it contacts are shown in detail in FIG. 2B, which is discussed further below. The armature assembly is held on either end in main chamber 232 with elastic members 210 (e.g., Archimedes springs.)

Control coil 205 is circumferentially wound in the slot formed by yoke elements 206. When control coil 205 is energized, it produces magnetic flux (not shown in this view) that interacts with the magnetic flux of disc-shaped permanent magnets 202 and 252 in air gaps 237 and 239 to produce lateral force. The magnetic flux of coil 205 is primarily directed through one guide/stop 204, air gaps 237 and 239, armature base 201, second guide/stop 204 and returning through coils case 207. Depending on the direction of the current in coil 205, the magnetic flux in air gaps 237 and 239 either aids or reduces the magnetic flux of corresponding permanent magnets 202 and 252. The force resulting from the interaction of the magnetic field of control coil 205 and permanent magnets 202 and 252 causes the armature to move either left or right against elastic members 210 depending on the direction of the current in control coil 205. Each pilot end 230 on poppet ends 203 interfaces with a seat 246 to form a pilot valve. As the armature assembly moves under the action of an embedded force motor, one of the pilot valves increasingly opens and the other increasingly closes thereby changing the pressure drop across the pilot valve to cause fluid in path 220 and 221 to exhibit differential pressures. Control ports 222 and 223 deliver the differential pressure to the main stage (not show).

Figure 2B:
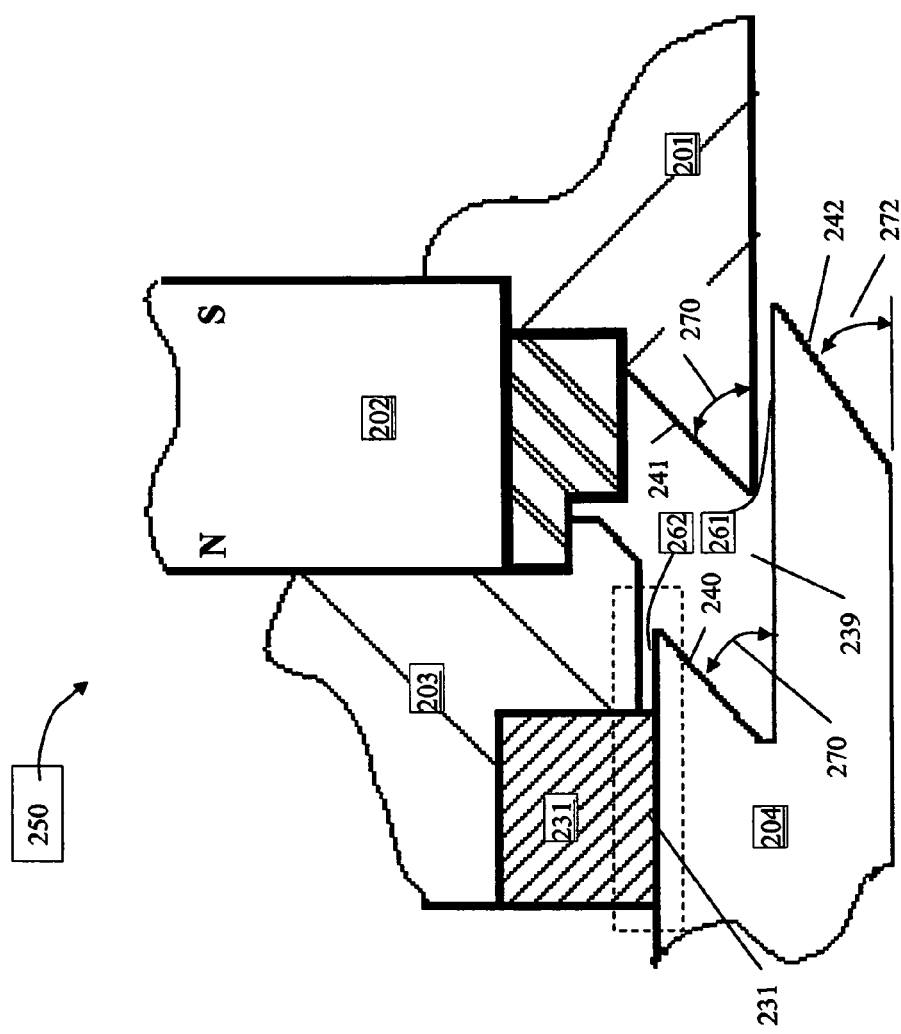
FIG. 2B is a cross-section of a portion of the miniature servo valve of FIG. 1A detailing the non-magnetic bearing surfaces used to reduce the friction, wear, and to improve performance of the miniature servo valve of FIG. 2A.

FIG. 2B illustrates an embodiment of the present invention of an expanded view of dotted area 250 shown in FIG. 2A to further describe bearing surface 260 that replaces the sliding bearing contact surfaces 131 in servo valve 100. Referring to FIG. 2B, FIG. 2B shows a portion of armature base 201, poppet end 203, magnet 202 and non-magnetic insulator 209 used to retain magnet 202. Guide/stop 204 now only contacts the armature assembly at poppet ends 203 using circumferential bearing elements 231. Features 240-242 are sloped to modify the magnetic path and aid in ensuring a linear force versus applied input power to coil 205 (not shown in this view). While this view only shows one of the four cross-sections displaying the relationship of these sliding surfaces and magnetic features between the armature assembly and the stator of the force motor, it is understood that the other three areas have like features. Air gap 261 results from forcing the armature to only contact guide/stops 204 using bearing element 231. Air gap 261 is sized to ensure that there is no additional contact between guide/stops 204, armature base 201 and poppet ends 203 when the armature assembly moves in a non-lateral direction under the influence of external vibrational forces. Bearing element 231 may be made of a high density polyethylene such as made by Meldin Corporation. The mating surface of contact area 260 would likewise be prepared to be compatible with bearing element 231. Embodiments of the present invention use bearing elements 231 as frictional contact surfaces to ensure a more reliable and predictable friction force for servo valve 200 as well as keeping friction surfaces from being damaged by non-lateral vibrational forces. Further, by not allowing magnetic surfaces such as bearing contact surface 131 in servo valve 100 of FIGS. 1A-1D to contact, forces resulting from residual magnetism of these surfaces as a result of coupling magnetic flux are eliminated. Sometimes these forces from contacting magnetic surfaces are referred to as "sticktion."

Sloped surface 242 may be stepped (not shown for simplicity) as slope surface 145 as described relative to servo valve 100 in FIG. 1C. The description of the function of stepped slope 145 described relative to servo valve 100 would be the same for servo valve 200 in the embodiment of FIG. 2A and is not repeated for the sake of brevity.

Figure 3A:
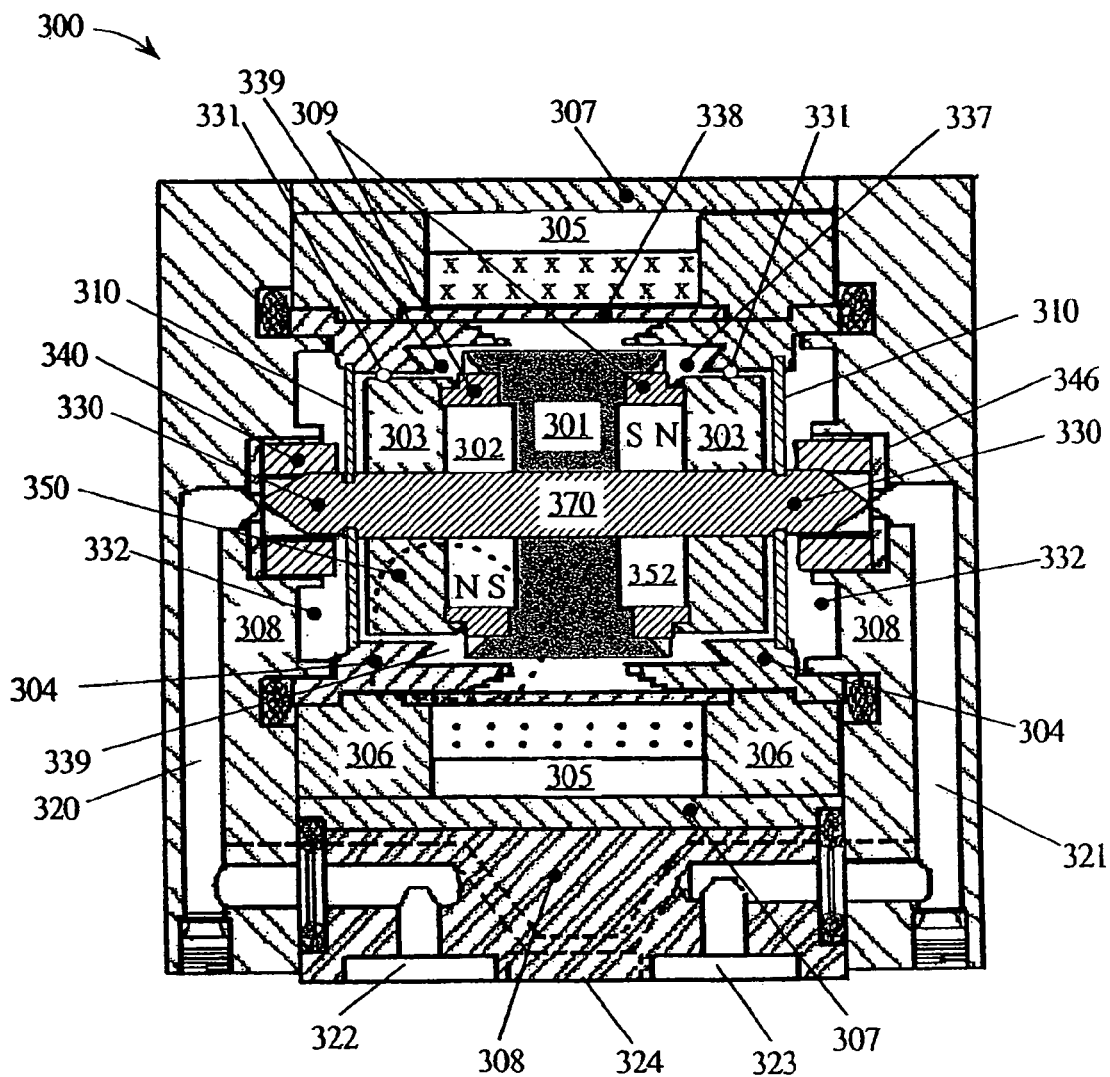
FIG. 3A is a cross-section of a servo valve according to embodiments of the present invention with an embedded miniature force motor using a non-magnetic shaft in the armature to increase the stiffness of the armature assembly.

FIG. 3A is an embodiment of the present invention where a cross-section of a servo valve 300 with an embedded miniature force motor uses a non-magnetic shaft 370 in the armature to increase the stiffness of the armature assembly. Referring to FIG. 3A, servo valve 300 has an embedded force motor that again comprises an armature assembly that moves inside of a main chamber 332. Main chamber 332 is formed by yokes 306 and a bobbin piece 338 which make up the bobbin assembly. Magnetic yokes 306 are made of magnetic material and form part of the path for the magnetic flux that results from energizing control coils 305. Guide/stops 304 form part of a stator of the force motor and have surfaces that are in contact with the moving armature assembly. Details of special surface shapes on guide/stops 304 and armature base 301 are shown dotted in area 350 and function similar to like features in FIG. 2B. An explanation of guide/stops 304 and armature base 301 is not repeated here for the sake of brevity. Fluid is delivered to port 324 at a high pressure and undergoes pressure drops through a first of two fixed orifices (not shown), one for each path 320 and 321. A second pressure drop happens at each pilot valve controlled by poppet ends 303 on the armature assembly. The fluid in main chamber 332 is coupled to the return port (not shown) which is at atmospheric pressure.

The armature assembly moves in main chamber 332 and comprises on armature shaft 370 that supports an armature base 301, two disc ring-shaped permanent magnets 302 and 352 with opposing magnetic polarization, and two poppet ends 303 that form part of the magnetic path. Each end of armature shaft 370 engages a cylindrical bearing element 340 and has pilots 330 that interface with pilot valves on each fluid path 320 and 321. Guide/stops 304 provide stop action against excess lateral motion of the armature assembly while locally shaping the magnetic path for the magnetic field of permanent magnets 302 and 352. Non-magnetic insulating elements 309 are used to retain disc ring-shaped magnets 302 and 352 to armature base 301 and armature ends 303. Disc-ring shaped magnets 302 and 352 are magnetically polarized in opposing directions. The magnetic flux from (not shown in this view) exemplary permanent magnet 302 is directed, starting in a left direction, through left poppet end 303 and air gap 331, left guide/stops 304, through air gap 339 and closing through armature base 301. The magnetic flux (not shown in this view) from exemplary permanent magnet 352 is directed in a right direction through right poppet end 303 and air gap 331, through air gap 337 and right guide/stops 304 and again closing through armature base 301. Disc-ring shaped magnets 302 and 352 are attached to armature base 201 and armature shaft 370 with non-magnetic insulators 309 to prevent magnetic flux from leaking between armature base 301 and two armature ends 303. Each end of armature shaft 370 engages a cylindrical bearing element 340. Likewise, armature shaft 370 is coupled to elastic elements 310 (e.g., Archimedes springs) that operate to center the armature assembly in the center between the two pilot valve seats 346 when coil 305 is not energized.

Control coil 305 is circumferentially wound in a bobbin assembly formed by magnetic yoke elements 306 and non-magnetic bobbin element 338. When control coil 305 is energized, it produces a magnetic flux (not shown in this view) that interacts with the magnetic flux of disc-shaped permanent magnets 302 and 352 in air gaps 337 and 339 to produce lateral force. The magnetic flux of coil 305 is primarily directed through one guide/stop 304, air gaps 337 and 339, armature base 301, the second guide/stop 304 and returning through coils case 307. Depending on the direction of the current in coil 305, the magnetic flux in air gaps 337 and 339 either aids or reduces the magnetic flux of corresponding permanent magnets 302 and 352. The force resulting from the interaction of the magnetic field of control coil 305 and permanent magnets 302 and 352 causes the armature assembly to move either left or right against support elastic members 310 depending on the direction of the current in control coil 305. Pilot ends 330 on the armature shaft 370 interface with seats 346 to form two pilot valves, one in path 320 and one in path 321. As armature assembly moves under the action of the embedded force motor, one of the pilot valves increasingly opens and the other increasingly closes thereby changing the pressure drop across the pilot valve to cause fluid in path 320 and 321 to exhibit differential pressures. Control ports 322 and 323 deliver the differential pressure to the main stage (not show).

Figure 3B:
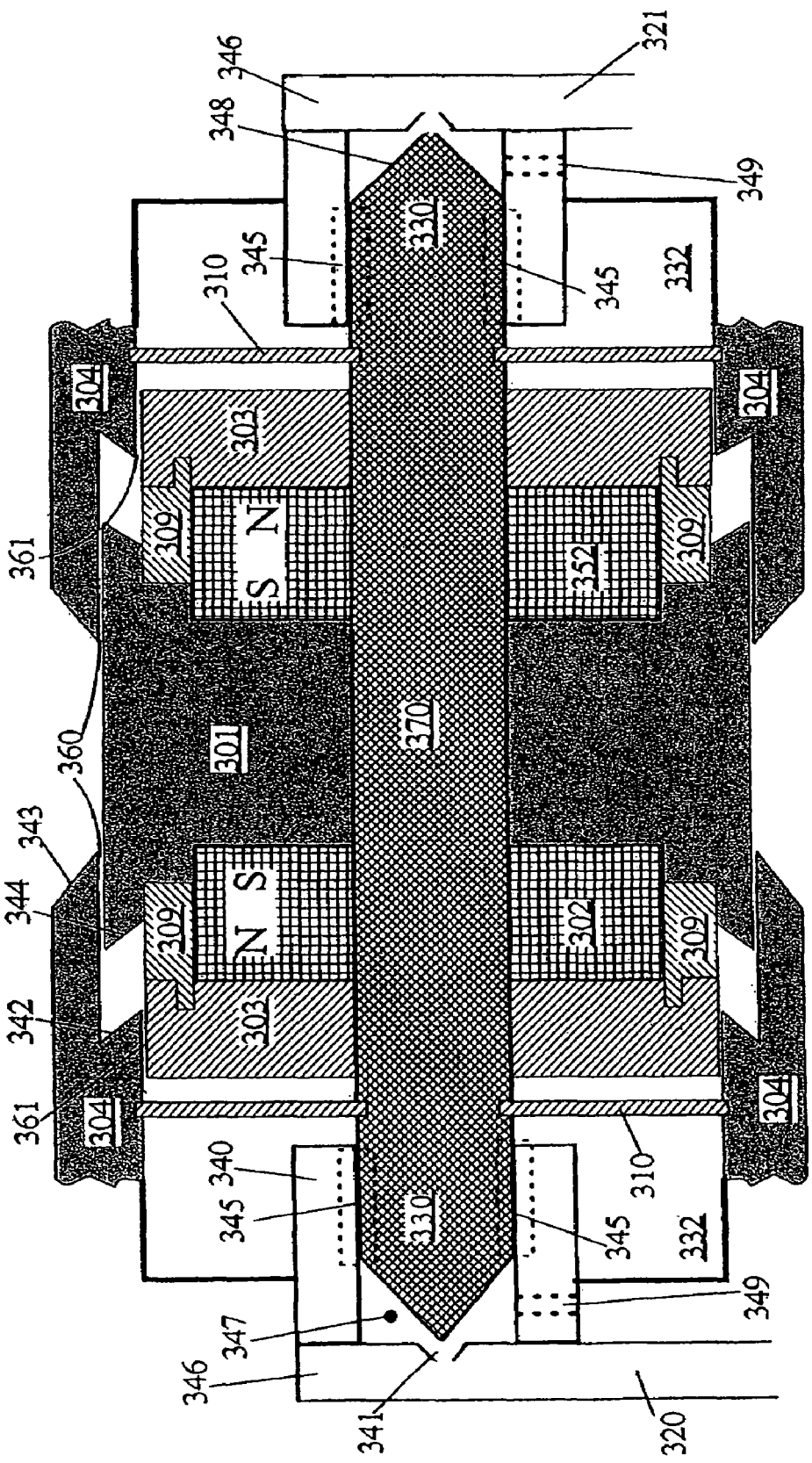
FIG. 3B is a cross-section of a portion of the servo valve of FIG. 3A detailing the bearing surfaces and the poppet ends that form the pilot valve.

FIG. 3B illustrates an embodiment of the present invention of a cross-section diagram of the armature assembly of servo valve 300 of FIG. 3A. Referring to FIG. 3B, FIG. 3B further illustrates an embodiment of the present invention with cylindrical bearing element 340 on the ends of armature shaft 370 and portions of pilot valve seats 346. Also shown is the interface between the armature assembly and guide/stops 304. Armature shaft 370, magnets 302 and 352 and magnetic material armature ends 303 are coupled with non-magnetic insulator elements 309 to form the armature assembly. Guide/stops 304 have magnetic surfaces 342-344 that operate to shape the magnetic flux distribution and to modify the leakage flux paths from magnets 302 and 352. These features were described relative to FIGS. 1B-1C and 2B and are not repeated hear for the sake of brevity. The magnetic flux paths also comprise air gaps 360 and 361. Magnetic flux in these paths does not produce lateral forces. Armature shaft 370 is coupled to guide/stops 304 with elastic members 310. Cylindrical bearing 340 engages armature shaft 370 at bearing surfaces 345.

In another embodiment of the present invention, the bearing surfaces are replaced by suitably shaped linear bearings with a roller element (not shown in this view). Each pilot end 348 of armature shaft 370 is operable to interact with the pilot valve seats 341 as the armature assembly moves laterally left and right. Cylindrical bearing 340 is ported (347) so that fluid from path 320 and 321 is delivered to volume 347 between pilot end 348 of armature shaft 370 and pilot valve seat 341. Armature shaft 370 predominately determines the stiffness of the armature assembly and thus its non-lateral motion under vibration and G forces. There are not sliding frictional surfaces and thus wear, wear particulate, and residual surface magnetic forces are minimized or eliminated.

Figure 4A:
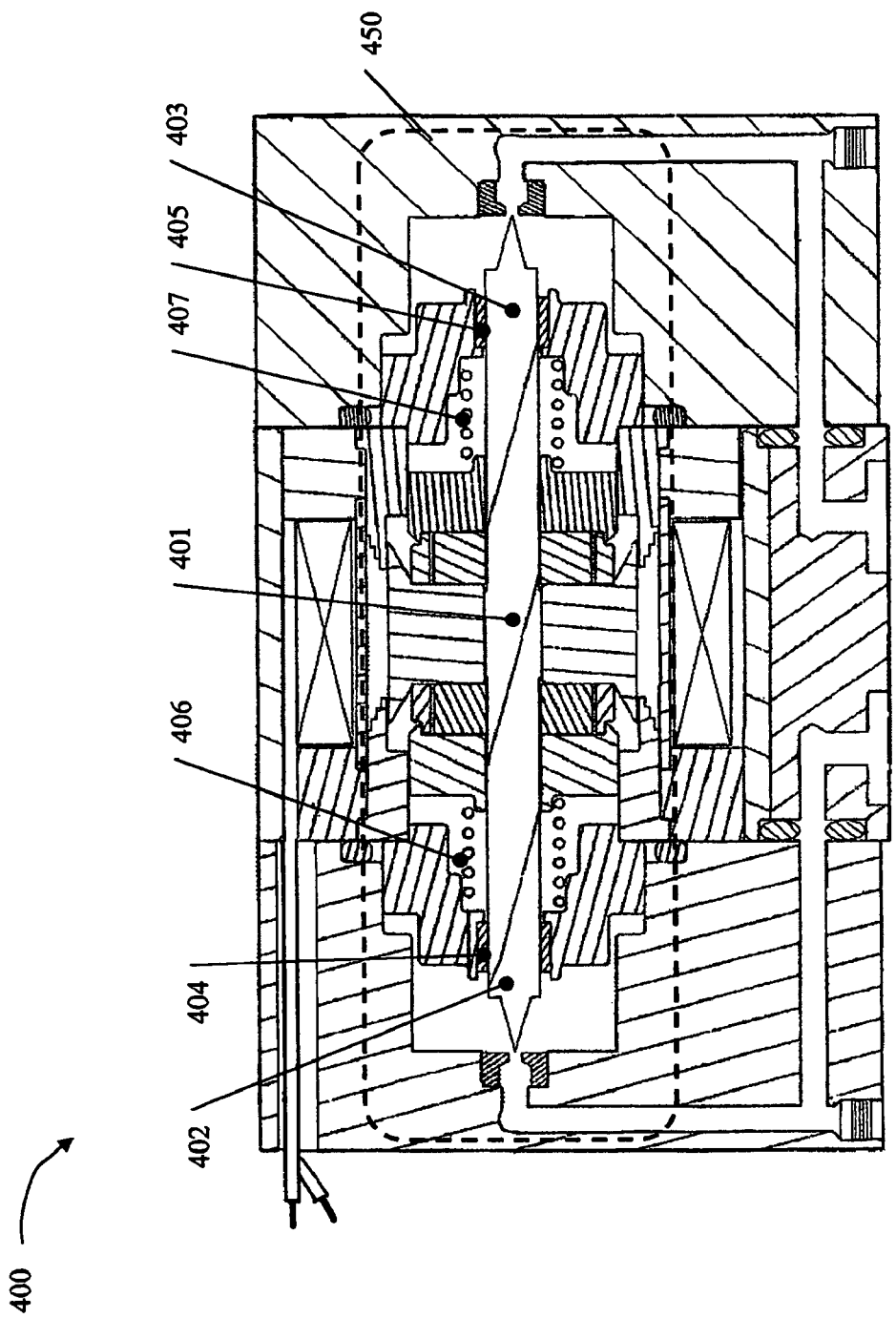
FIG. 4A is a cross section of a servo valve according to embodiments of the present invention with an embedded miniature force motor using an extended non-magnetic shaft to increase the bearing area and using regular compression springs to increase resistance to shock and vibration.

FIG. 4A is another embodiment of the present invention of a cross section of servo valve 400. Referring to FIG. 4A, servo valve 400 uses a shaft 401 with extended length 402 and 403 to increase the bearing surfaces 404 and 405 to 100% contact over the full travel of shaft 401. The centering force is provided by regular compression springs 406 and 407 which increase spatial stiffness of shaft 401 and dampen the effect of shock and vibration on shaft 401.

Figure 4B:
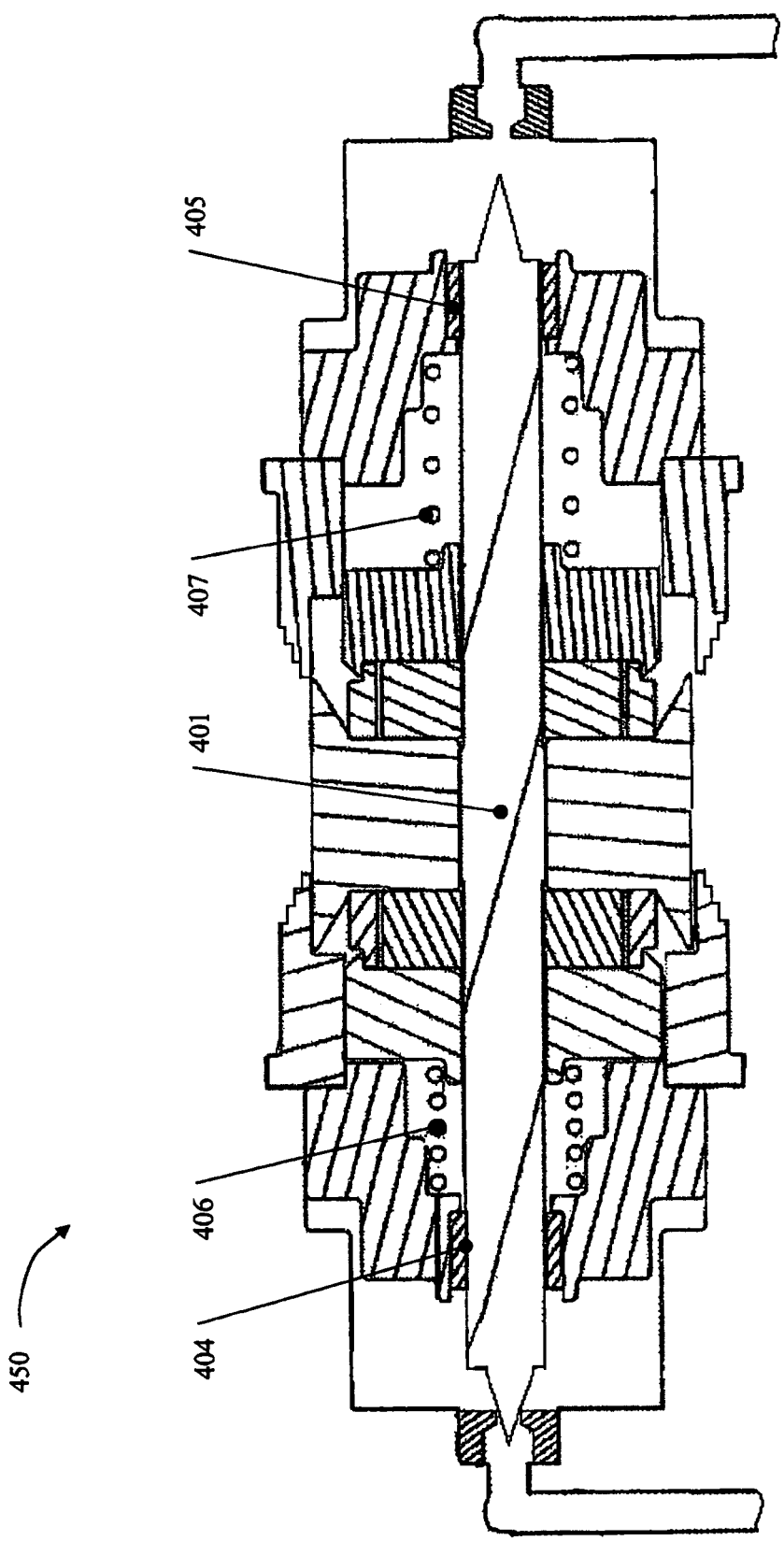
FIG. 4B is a cross section of a portion of the servo valve of FIG. 4A detailing the bearing surfaces and compression spring configuration.

FIG. 4B illustrates an embodiment of the present invention of a cross sectional diagram of the shaft assembly of servo valve 400 of FIG. 4A. Referring to FIG. 4B, non-magnetic shaft 401 has been displaced by a magnetic flux (not shown in this view) compressing spring 406 and expanding spring 407 while maintaining full bearing contact 404 and 405.

Although the present invention and its advantages have been described in detail, it should be understood that various changes, substitutions and alterations can be made herein without departing from the spirit and scope of the invention as defined by the appended claims.

What is claimed is:

1. A servo valve, comprising:
   a chamber having first and second end caps with first and second pilot valve seats with openings to first and second ports;
   a force motor comprising a stator having a stator coil and forming a cylindrical portion of said chamber, wherein said force motor further comprises:
   an armature assembly moveable inside said chamber in response to a current in said stator coil, wherein said armature assembly is held on either end of said chamber with elastic members, wherein said armature assembly comprises:
      a plurality of pilot valves formed by interfacing with said chamber,
   wherein each of said plurality of pilot valves is formed when a pilot interfaces with one of said first and second pilot valve seats;
      a plurality of guide/stops in contact with said armature assembly, wherein
   said plurality of guide/stops forms a portion of said stator of said force motor;
      an armature base, and
      a plurality of magnets attached to said armature base, wherein said
   plurality of magnets are magnetically polarized axially in opposing directions;
   a third port coupled to said chamber and configured to receive fluid under pressure; and
   surface features located on said armature base and on one of said plurality of guide/stops, wherein said surface features are sloped to modify a magnetic path of first and second air gaps and leakage paths between said one of said plurality of guide/stops and said armature base whereby the linearity of a magnetic force to an applied input current can be adjusted by adjusting said surface features,
      wherein a surface feature of at least one of said plurality of guide/stops comprises: a stepped surface configured to approximate a concave shape, wherein the length of the concave shape can be adjusted to lengthen the proportional stroke and the linearity of said proportional stroke can be adjusted by the degree the stepped surface approximates the concave shape, said at least one of said plurality of guide/stops further comprises a corresponding surface radially oppositely spaced apart from said stepped surface and having a slope matching said stepped surface.

2. The servo valve as recited in claim 1, wherein said servo valve further comprises:
   poppet ends of magnetic material coupled axially with said plurality of magnets, wherein said armature assembly slides on bearing contact surfaces of said plurality of poppet ends and said armature base.

3. The servo valve as recited in claim 1, wherein one of said surface features is a slope feature that affects a magnetic flux leakage path between said one of said plurality of guide/stops and said armature base.

4. The servo valve as recited in claim 1, wherein said first air gap is formed between a first end of said armature base and a first of said plurality of guide/stops, wherein said second air gap is formed between a second end of said armature base and a second of said plurality of guide/stops, wherein said first and said second air
   gaps vary in direct, inverse relationship with one another as said armature assembly moves laterally inside said chamber.

5. The servo valve as recited in claim 4, wherein fluid flow to said first and second ports is controlled by a position of said armature assembly, wherein said position of said armature assembly is controlled by a magnitude and direction of said current in said stator coil.

6. The servo valve as recited in claim 1 further comprises:
   said stator coil circumferentially wound in a bobbin assembly surrounding said chamber, wherein when said stator coil is energized it produces a magnetic flux that interacts with a magnetic flux of said plurality of magnets to produce a lateral force.

7. The servo valve as recited in claim 6, wherein said magnetic flux produced by said stator coil aids or reduces said magnetic flux produced by one of said plurality of magnets and aids said magnetic flux produced by another one of said plurality of magnets based on a direction of said current in said stator coil.

8. The servo valve as recited in claim 1, wherein a first of said plurality of pilot valves increasingly opens and a second of said plurality of pilot valves increasingly closes thereby changing pressure drops in said first and second ports as said armature assembly moves inside said chamber.

9. The servo valve as recited in claim 1, wherein a layer of polytetraflouroethylene is deposited on a surface of said armature assembly to function as a bearing.

10. A servo valve, comprising:
   a chamber having first and second end caps with first and second pilot valve seats with openings to first and second ports;
   a force motor comprising a stator having a stator coil and forming a cylindrical portion of said chamber, wherein said force motor further comprises:
   an armature assembly moveable inside said chamber in response to a current in said stator coil, wherein said armature assembly is held on either end of said chamber with elastic members, wherein said armature assembly comprises:
      a plurality of pilot valves formed by interfacing with said chamber,
   wherein each of said plurality of pilot valves is formed when a pilot interfaces with one of said first and second pilot valve seats;
      an armature base; and
      a plurality of magnets attached to said armature base, wherein said plurality of magnets are magnetically polarized axially in opposing directions;
   a plurality of guide/stops in contact with said armature assembly, wherein said plurality of guide/stops forms a portion of said stator of said force motor; wherein said plurality of guide/stops contacts a poppet end on said armature assembly using circumferential bearing elements;

a third port coupled to said chamber and configured to receive fluid under pressure; and surface features located on said armature base and on one of said plurality of guide/stops, wherein said surface features are sloped to modify a magnetic path of first and second air gaps and leakage paths between said one of said plurality of guide/stops and said armature base, whereby the linearity of a magnetic force to an applied input current can be adjusted by adjusting said surface features, wherein a surface feature of at least one of said plurality of guide/stops comprises: a stepped surface configured to approximate a concave shape, wherein the length of the concave shape can be adjusted to lengthen the proportional stroke and the linearity of said proportional stroke can be adjusted by the degree the stepped surface approximates the concave shape, said at least one of said plurality of guide/stops further comprises a corresponding surface radially oppositely spaced apart from said stepped surface and having a slope matching said stepped surface.

11. The servo valve as recited in claim 10, wherein said circumferential bearing elements are made of a high density polyethylene.

12. The servo valve as recited in claim 10, wherein said circumferential bearing elements are used as a frictional contact surface.

13. The servo valve as recited in claim 10, wherein an air gap results from forcing said armature assembly to contact said plurality of guide/stops using said circumferential bearing elements, wherein said air gap is sized to ensure that there is no additional contact between said plurality of guide/stops and said armature base when said armature assembly moves in a non-lateral direction under an influence of external vibration forces.

14. The servo valve as recited in claim 10, wherein one of said surface features is a slope feature that affects a magnetic flux leakage path between said one of said plurality of guide/stops and said armature base.

15. The servo valve as recited in claim 10 further comprises:

said stator coil circumferentially wound in a bobbin assembly surrounding said chamber, wherein when said stator coil is energized it produces a magnetic flux that interacts with a magnetic flux of said plurality of magnets to produce a lateral force.

16. The servo valve as recited in claim 15, wherein said magnetic flux produced by said stator coil aids or reduces said magnetic flux produced by one of said plurality of magnets and aids said magnetic flux produced by another one of said plurality of magnets based on a direction of said current in said stator coil.

17. A servo valve, comprising:

a chamber having first and second end caps with first and second pilot valve seats with openings to first and second ports;

a force motor comprising a stator having a stator coil and forming a cylindrical portion of said chamber, wherein said force motor further comprises:

an armature assembly moveable inside said chamber in response to a current in said stator coil, wherein said armature assembly is held on either end of said chamber with elastic members, wherein said armature assembly comprises:

a plurality of pilot valves formed by interfacing with said chamber, wherein each of said plurality of pilot valves is formed when a pilot interfaces with one of said first and second pilot valve seats;

an armature base; and a plurality of magnets attached to said armature base, wherein said plurality of magnets are magnetically polarized axially in opposing directions;

a non-magnetic shaft configured to engage a cylindrical bearing element, wherein said non-magnetic shaft is coupled to said elastic members that operate to center said armature assembly between said first and second pilot valve seats; and a plurality of guide/stops in contact with said armature assembly, wherein said plurality of guide/stops forms a portion of said stator of said force motor;

a third port coupled to said chamber and configured to receive fluid under pressure; and surface features located on said armature base and on one of said plurality of guide/stops, wherein said surface features are sloped to modify a magnetic path of first and second air gaps and leakage paths between said one of said plurality of guide/stops and said armature base, whereby the linearity of a magnetic force to an applied input current can be adjusted by adjusting said surface features, wherein a surface feature of at least one of said plurality of guide/stops comprises: a stepped surface configured to approximate a concave shape, wherein the length of the concave shape can be adjusted to lengthen the proportional stroke and the linearity of said proportional stroke can be adjusted by the degree the stepped surface approximates the concave shape, said at least one of said plurality of guide/stops further comprises a corresponding surface radially oppositely spaced apart from said stepped surface and having a slope matching said stepped surface.

18. The servo valve as recited in claim 17, wherein said cylindrical bearing element engages said non-magnetic shaft at bearing surfaces.

19. The servo valve as recited in claim 17, wherein each pilot end of said non-magnetic shaft is operable to interface with one of said first and second pilot valve seats as said armature assembly moves laterally left and right.

20. The servo valve as recited in claim 17, wherein said cylindrical bearing element is ported so that fluid is delivered to a volume between a pilot end of said non-magnetic shaft and one of said first and second pilot valve seats.

21. The servo valve as recited in claim 17, wherein one of said surface features is a slope feature that affects a magnetic flux leakage path between said one of said plurality of guide/stops and said armature base.

22. The servo valve as recited in claim 17, wherein the sloped stepped surface configured to approximate a desired concave face has a recess toward the centrifugal direction from said shaft and such stepped surface further comprises a plurality of cylindrical surfaces with gradually decreasing diameters toward the armature assembly.

23. The servo valve as recited in claim 17 further comprises:

said stator coil circumferentially wound in a bobbin assembly surrounding said chamber, wherein when said stator coil is energized it produces a magnetic flux that interacts with a magnetic flux of said plurality of magnets to produce a lateral force.

24. The servo valve as recited in claim 23, wherein said magnetic flux produced by said stator coil aids or reduces said magnetic flux produced by one of said plurality of magnets and aids said magnetic flux produced by another one of said plurality of magnets based on a direction of said current in said stator coil.

25. The servo valve as recited in claim 17, wherein said non-magnetic shaft is spatially stiffened via compression springs attached to said non-magnetic shaft.

26. The servo valve as recited in claim 25, wherein said non-magnetic shaft is displaced by a magnetic flux compressing said compression springs while said non-magnetic shaft maintains, contact with the bearing surfaces.

* * * * *